United States Patent

Iritz

[11] 3,923,406
[45] Dec. 2, 1975

[54] CABLE GRIP

[76] Inventor: Andrew Frank Iritz, 930 Andover Terrace, Ridgewood, N.J. 07450

[22] Filed: Mar. 17, 1975

[21] Appl. No.: 559,052

[52] U.S. Cl. .................. 403/43; 151/5; 24/135 R; 339/255 B; 403/215
[51] Int. Cl.² .......................................... F16B 7/06
[58] Field of Search ....... 403/43, 44, 347, 373, 320, 403/215; 339/244 B, 249 B, 255 B, 272 B; 151/5; 24/135 R, 135 M, DIG. 115

[56] References Cited

UNITED STATES PATENTS

| | | | |
|---|---|---|---|
| 634,766 | 10/1899 | Roche | 339/272 B |
| 1,153,649 | 9/1915 | Tanner | 151/5 |
| 1,390,481 | 9/1921 | Bardin | 339/255 B X |
| 1,408,487 | 3/1922 | Thorn | 151/5 |
| 1,502,417 | 7/1924 | Arnstein | 24/135 R |
| 1,538,750 | 5/1925 | Scognamillo | 339/255 B X |
| 1,649,071 | 11/1927 | Lowe | 151/5 UX |
| 2,164,075 | 6/1939 | O'Russa | 339/244 B |
| 2,218,210 | 10/1940 | Mebold | 24/135 R |
| 2,359,632 | 10/1944 | Eales | 24/135 R X |
| 3,210,818 | 10/1965 | Wallshein | 24/115 R |

*Primary Examiner*—Werner H. Schroeder
*Assistant Examiner*—Wayne L. Shedd
*Attorney, Agent, or Firm*—Richard L. Cannaday

[57] ABSTRACT

A grip member for a cable, wire or rope includes a threaded body having a pair of diametrically opposed, longitudinally disposed tapered grooves terminating with or in association with a transaxial hole. Through this hole the cable, wire or rope to be secured in the grip is threaded and when the desired length thereof has been pulled through this hole a nut carried on the threaded body is rotated forwardly toward the transversely retained portion of the cable, wire or rope. This nut engages this transversely retained portion and pushes this portion against the side of the hole and partially into the groove to lock the retained cable, wire or rope at the desired attitude.

12 Claims, 12 Drawing Figures

3,923,406

CABLE GRIP

BACKGROUND OF THE INVENTION

1. Field of the Invention

With reference to the classification of art as established in the United States Patent Office the present invention is found in the general Class titled, "Buckles, Buttons, Clasps, etc." (Class 24) and the subclass therein titled, "cord and rope holders — wedge slots" (subclass 130).

It is also to be noted that a new general Class has been established and is entitled, "Joints and Connections" (Class 403) and relevant art may be found in the subclass entitled, "distinct end coupler — including member wedging or camming means" (subclass 314).

2. Description of the Prior Art

Slip knots and woven loop ends for ropes, cables, and reasonably flexible wire strands are well known. U-bolt cable and wire clamps are also known as are crimp-type sleeves which are used to form fixed loops which are secured to eye-bolts, screws, etc. Plate-like members having cut-outs in which rope or cable is threaded to provide knot-like retention are also known. Adjustable buckles such as are used with luggage racks and seat belts also provide means for adjustably locking a flexible member at a selected position.

None of these methods or apparatus provides a simple readily adjustable means for locking a cable, wire or rope to a grip member. Prior art devices shown in U.S. Patents include a wire clamp shown in U.S. Pat. No. 1,023,706 to ANDERSON as issued on Apr. 16, 1912; a cord tie as seen in U.S. Pat. No. 1,200,012 to OLDHAM as issued on Oct. 3, 1916; a cable loop clamp as seen in U.S. Pat. No. 2,372,754 to WICKENS as issued on Apr. 3, 1945 and in U.S. Pat. No. 1,883,530 to BUISSET as issued on Oct. 18, 1932 and in which is seen a wire tightening device.

Applicant herein provides a grip member requiring in certain embodiments only two members. Of economical construction, the grip of this invention is easily manipulated and requires only a plier or wrench for manipulating a nut-like member to provide the desired looking action. Essentially the grip member whether of an eye-bolt general configuration, a turnbuckle design or with a screw end includes a threaded portion in which a transaxial hole is formed for the mounting therein of the cable. Associated with each end of this transaxial hole is a groove of short duration. A nut carried on the threaded portion is tightened to clamp the cable in position.

SUMMARY OF THE INVENTION

This invention may be summarized at least in part with reference to its objects. It is an object of this invention to provide, and it does provide, a cable grip having a threaded portion in which is formed a transaxial hole and a guide groove associated with each end of the hole. A nut carried on this threaded portion is advanced toward and a short distance past the hole to engage and lock a cable mounted in the hole.

It is a further object of this invention to provide, and it does provide, a cable grip which may be formed to provide a use configuration of an eye-bolt, a screw-type grip, a coupling link and a turnbuckle.

The cable grip is preferably of metal and the threaded portion has rounded crests and valleys which with the grooves and transaxial hole have all corners smoothed to diminish the possibility of cutting a secured cable, wire or rope.

In brief, this invention pertains to a cable grip made from a metal rod having a threaded portion. In one embodiment the rod is bent into the configuration of an eye-bolt. It is also to be contemplated that the grip may be made as a screw or as a turnbuckle or as a cable connector. In conjunction with this threaded metal rod portion there is a nut rotatably mounted thereon. A transaxial hole is formed in this threaded portion and in conjunction with this hole there are formed two grooves longitudinally displaced and tapering from the hole to the surface of the threads so that when a cable, wire or rope is fed through this hole and the nut is advanced toward and slightly past the hole this nut engages the transverse portion of the rope or cable to cause it to be locked in position against the side of the hole and to be clamped at this adjusted position until the nut is backed away from the hole. The configuration of the grip determines its use, for example, the eye-bolt may be used to secure the cable to hooks, pins or pegs. As a screw the grip may be used to attach the cable to a wall or floor. As a turnbuckle the grip may be used to tighten up two cables and act as a connector.

In addition to the above summary the following disclosure is detailed to insure adequacy and aid in understanding of the invention. This disclosure, however, is not intended to cover all variations of the inventive concept no matter how it may be disguised by variations in form or additions. For this reason there have been chosen two embodiments of the threaded shank portion of the cable connector configurations. Other combinations or configurations of the grooves and transaxial holes may be employed. For the purposes of illustration and description several embodiments are shown in the accompanying drawings wherein:

Figure 1:
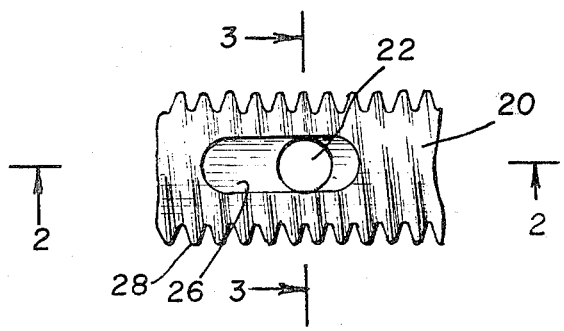
FIG. 1 represents a plan view showing a threaded section of metal comprising the shank of the grip and absent the nut used thereon.

In the following description and in the claims various details will be identified by specific names for convenience. The names, however, are intended to be generic in their application. Corresponding reference characters refer to like members throughout the several figures of the two sheets of drawings.

The two drawings accompanying this specification discloses only those details of construction necessary for the purpose of explanation of the broader aspects of the invention, but it should be understood that these details may be modified in various respects without departure from the concept and principles of the invention and that the invention may be incorporated in other structural forms than shown.

DESCRIPTION OF THE PREFERRED EMBODIMENT OF FIGS. 1, 2 AND 3

Figure 2:
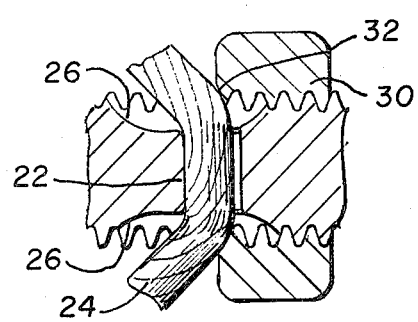
FIG. 2 represents a sectional view taken on the line 2–2 of the grip portion of FIG. 1 and showing in combination with that shank a nut and a cable mounted therein.
Figure 3:
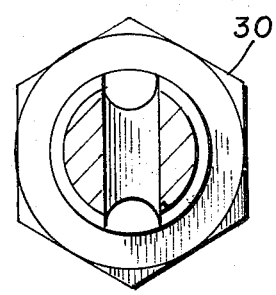
FIG. 3 represents an end view taken on the line 3–3 of FIG. 1 and showing in particular the shank portion with a nut mounted in position thereon.

Referring now in particular to the embodiment of FIGS. 1, 2 and 3, there is depicted a cable grip wherein a threaded shank portion 20 is of metal which may be hardened to a certain degree, if desired, and having formed therein a transaxial hole 22. This transaxial hole is of a selected size which allows the threading or passing therethrough of a cable, wire or rope 24. The depicted member is the cable which is to be secured to the cable grip at a determined position of its midlength. At the termination or end of the transaxial hole 22 there is formed a longitudinal groove 26 in the threaded portion of the shank. This groove is of a shallow depth and preferably tapers from slightly below the root of the thread 28 where it meets the transaxial hole to emerge at the surface of the thread at a selected distance from the hole. In this particular embodiment the groove is depicted as being formed with a milling-type cut wherein a milling cutter is sunk into the threaded body causing a run out of the cut to the surface of the thread 28. This run out is shown as extending past the transaxial hole. The hole and the groove where they intersect are smoothed by a chamfering or other means to remove any cutting edge. This reduces the possibility of the cable, wire or rope from being cut when mounted in the transaxial hole. The cable is deflected toward and into the groove with the forward movement of the nut toward the hole. It is also to be noted in this connection that the threads 28 are depicted as preferably rounded so as to reduce cutting potential by the abrasion or accidental engagement of the cable, wire or rope when pressed or dragged against the edges of the thread. The nut 30 may be a hex configuration or be made of any other conventional configuration instead of the hex nut depicted, for example, a wing nut or any other threaded fastener including a knurled fastening means. The leading or leftward edge of the aperture 32 in the female threaded fastening nut is preferably rounded to provide a smooth noncutting contoured face.

USE OF THE CABLE GRIP AS IN FIGS. 1, 2 and 3

In operation the shank portion 20 of the cable grip has the exterior threads 28 formed with a regular configuration. The transaxial hole 22 is substantially at ninety degrees to the axis of the shank and preferably passes through the axis of the shank. The hole is formed of a size which is sufficiently large for the easy insertion of the cable, wire or rope 24 which is to be mounted in the transaxial hole. After the cable, wire or rope has been inserted into the hole to its desired positioning relative to the shank 20, the nut 30 is rotated to cause it to advance toward, to and possibly slightly past both edges of the transaxial hole 22 when a very small cable is mounted in the hole. The slightly chamfered portion 32 of the nut engages this cable, wire or rope and forces the cable leftwardly against the left side of the threaded hole producing a pinching action and on occasion with a small cable to be gripped in the grooves of the shank portion.

The chamfered portion 32 of the nut tends to cause the cable, wire or rope in the transaxial hole to be deflected leftwardly toward and into the groove 26 wherein the cable, wire or rope lays in the groove to a certain extent. The degree of advancement of the nut to a great extent determines the degree of angular condition or displacement of the cable into the groove. The depth and angle of the groove in relation to the advancement of the nut and rope also are determinative of the angle of the rope.

In the depicted cable grip, cables of much smaller size than the transaxial hole may be used and when the nut is advanced to clamp the cable the nut may advance past the left-hand edge of the hole to cause the cable to lay into the groove 26. This advance continues until the taper and the threads of the nut approach each other sufficiently to grip the cable.

TURNBUCKLE ASSEMBLY OF FIG. 4

Figure 4:
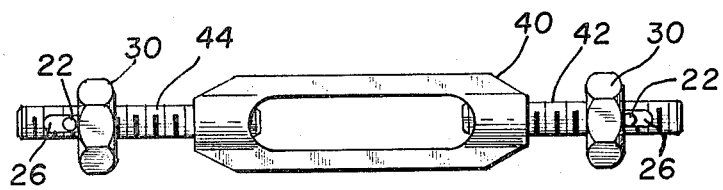
FIG. 4 represents a plan view in a slightly reduced scale and showing a cable grip of this invention in which two threaded sections are arranged with a turnbuckle connecting concept to enable two cable securing portions to be provided therewith.

Referring next to the turnbuckle assembly of FIG. 4, the cable grip assembly depicted includes threaded shank portions such as shown in FIGS. 1–3, above. These portions in combination with a turnbuckle unit 40 having both right and left-hand threaded end apertures receive and retain shank portions 42 and 44 formed to mate with the turnbuckle member 40. These threaded shank portions 42 and 44, except for their threaded pitch, are formed in the manner of FIGS. 1 through 3 above and are mounted in the appropriately threaded portions of the turnbuckle unit. The transaxial holes 22 formed in the shank portions 42 and 44 are formed with grooved portions 26 which are tapered outwardly in the manner above-described. In use the cable, wire or rope to be secured to the turnbuckle normally includes two cables or wires, one secured in each of the portions 42 and 44. With one cable mounted in the hole in the left-hand end 42 and the other cable or wire mounted in the hole 22 of the right-hand unit 44, the nuts are tightened to secure or grip the cable in its desired position and after securing the turnbuckle portion 40 is manipulated to cause the threaded portions 42 and 44 to be advanced inwardly or outwardly as is customary in turnbuckle adjustment.

EYE-HOOK ARRANGEMENT OF FIG. 5

Figure 5:
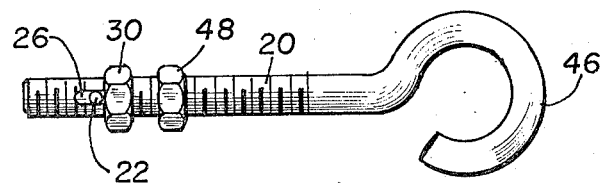
FIG. 5 represents a plan view showing a side arrangement, the shank section connected to an eye-bolt configuration providing an eye-bolt-type cable grip.

Referring next to FIG. 5, there is shown the threaded shank portion 20, as seen in FIG. 1, and mounted thereon is nut 30. In this particular embodiment the threaded shank is integrally attached to an unthreaded end portion which is formed into an eye-hook portion 46 of conventional configuration. In the threaded shank portion of the eye-hook the transaxial hole 22 and the longitudinal grooves 26 are formed in the manner as described in FIG. 1, In use the eye-hook portion 46 may be secured to a bolt, stick, a heavier wire or cable having an appropriate fastening means by which the eye-hook 46 may be secured thereto. As depicted, an auxiliary nut 48 is shown mounted on the threaded shank portion 20 and may be used as a lock nut to prevent the unwanted rotation of the nut 30 after it has been tightened and clamped to the cable or wire in the transaxial hole 22.

SCREW TYPE GRIP OF FIG. 6

Figure 6:
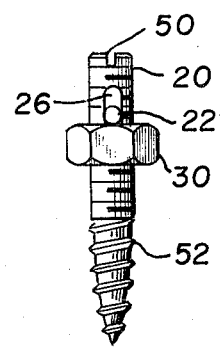
FIG. 6 represents a side view of yet another cable grip in which the metal shank portion has one end provided with a slot for driving by a screwdriver and the other end has an auger-type tapered screw such as is used for wood, metal or concrete and showing a nut mounted on the threaded shank portion.

Referring next to the embodiment shown in FIG. 6, there is shown the threaded shank portion 20 of FIG. 1 formed with a transaxial hole 22 through the midportion of the threaded shank. The upper end of this threaded shank is formed with a screw slot 50 adapted to receive the driving end of a screwdriver which may be used to rotate the screw type grip into and from a desired secured position. The distal or lower end of this portion is tapered and formed with an auger-type screw thread identified as 52. In the manner of auger-type screws this threaded portion may be inserted into wood or other material which is properly prepared to receive such a screw thread and this, of course, includes mounting plugs in concrete and masonry. Nut 30, in the manner as described in FIG. 2 above, is conventionally mounted upon the threaded shank portion 20 for use in retaining a cable, wire or rope which is threaded through the transaxial aperture 22. In use, the screw portion 52 is advanced to the desired secured location on the member into which it is to be mounted by means of the driving end of the screwdriver inserted into the screwdriver slot 50. After the screw type grip has been secured in the desired mounted position, the cable, wire or rope which is to be secured to this grip is fed into and through the transaxial hole 22 and after adjusting the cable or rope to the proper desired tension or length the nut 30 is advanced to lock this cable, wire or rope as in the manner described in FIGS. 1 through 3 above.

CONNECTING BAR GRIP OF FIG. 7

Figure 7:
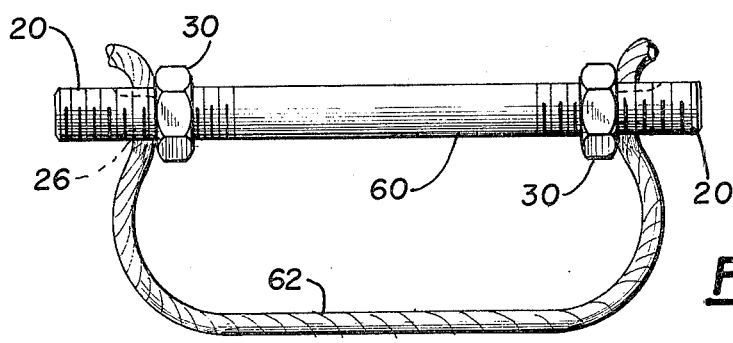
FIG. 7 represents a side view of yet another embodiment of a cable grip in which an elongated shank portion has two threaded ends each of which are provided with cable attaching portions and with both end portions having separate cable securing means similar to that shown in FIG. 1.

Referring next to FIG. 7, there is depicted the cable grip portions of FIGS. 1 through 3 formed on the ends of an extended connecting bar 60. As depicted, both ends of the bar 60 have threaded shank portions 20 as in the manner of FIG. 1 above and include the transaxial holes and the appropriately positioned longitudinal grooves 26 with the taper of the grooves extending toward the distal ends or the other ends of the connecting bar. Nuts 30 are conventionally mounted on each of the threaded portions 20 for the purpose of securing the wire, cable or rope to be used in combination with the transaxial holes 22 provided therein. As depicted, a rope or cable 62 is shown as threaded through each of the transaxial holes 22 provided in the connecting bar 60. Each of the nuts 30 is advanced to lock the cable into a desired position in the transaxial holes 22.

As shown, such an arrangement permits a slack or loop portion of the cable 62 to be formed and secured to the connecting bar to provide a desired loop. In addition, of course, instead of this loop portion, two separate cables may be secured to the bar 60 with one cable passing through the transaxial hole in the left threaded end and the other cable passing through the transaxial hole in the right threaded end of the grip bar after which each of the nuts 30 associated with the appropriately threaded portions is tightened to secure that cable at the desired position in the transaxial hole of the connecting bar.

ALTERNATE CONSTRUCTION OF FIG. 8

Figure 8:
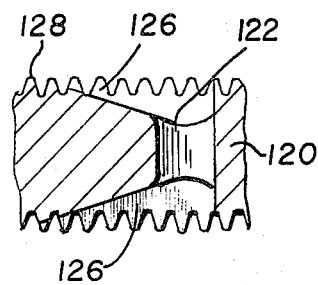
FIG. 8 represents an alternate construction of the shank portion of the cable grip of FIG. 1 in which the groove portions formed therein terminate at the transaxial hole formed as a portion of the shank.

Referring next to FIG. 8, there is depicted an alternate construction of a threaded shank portion 120 in which a transaxial hole 122 is formed in a manner similar to that of FIG. 1. In this particular configuration instead of the groove 26 formed as by a milling cut in FIG. 1, it is proposed that a swaging or deforming action be performed. In and on the threaded portion a tapered groove 126 is formed on diametrically opposite sides in the threaded portion of the shank 120. By means of this swaging action these grooves may be terminated with the deeper portion of the groove in coincidence with the transaxial hole 122. A selected slope is formed in the groove 126 and extends upwardly and outwardly to the left or distal end from the transaxial hole to the outer surface of the threads 128 of the threaded shank portion. This configuration is shown only to indicate that alternate constructions may be used for the forming of the grooves whereby instead of a cutting of the threaded shank portion with the groove passing through the transaxial hole, the groove may be terminated at the transaxial hole. With this swaging action a chamfer of the hole 122 would, of course, be provided so that no sharp edges would occur where the groove and the hole intersect.

CABLE GRIP IN ACCORDANCE WITH FIG. 9

Figure 9:
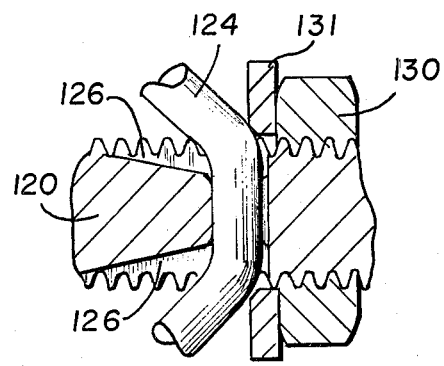
FIG. 9 represents a sectional side view of the shank construction of FIG. 8 in which an additional thin washer is utilized with the nut so as to reduce abrasion of the cable or rope mounted in the transaxial hole when the nut is adjusted into clamping and cable securing condition.

Referring next to FIG. 9, it is to be noted that the groove and transaxial hole configuration of FIG. 8 may be advantageously combined with a threaded nut 130. This nut 130 may be a hex nut similar to the nut 30, as seen in FIG. 2, or may be a wing nut or other threaded member and in conjunction with this nut, rather than have the chamfer 32 as provided on nut 30 seen in FIG. 2, there is provided an additional member in the form of a washer 131. This washer prevents abrading action on the cable or wire 124 which is mounted in the transaxial hole 122. As the nut 130 is rotated to urge the washer leftwardly to clamp the wire or cable in a locked condition in the hole 122, the washer slides along the threaded portion. In this manner the nut 130 does not necessarily require a chamfered inner edge to prevent an unwanted cutting of the cable 124 as it is advanced leftwardly to tighten the cable in the grooves 126.

GROOVE ASSEMBLY OF FIG. 10

Figure 10:
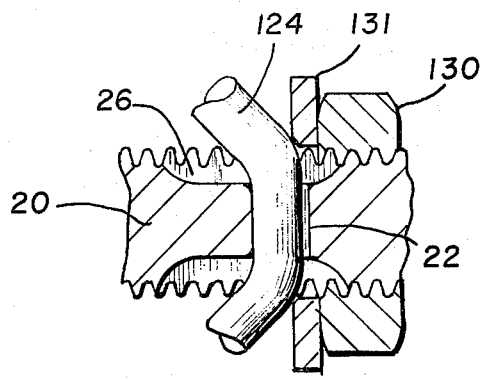
FIG. 10 represents a sectional view of a construction of the cable grip similar to FIG. 9 but with the grooves of FIG. 1 formed in the shank and with the thin washer of FIG. 9 used in combination with the nut of FIG. 9.

Referring next to FIG. 10, it is to be noted that the grooves 26 formed in the shank portion 20 of FIG. 1 are depicted in this arrangement. Cable 124 of FIG. 9 and the nut 130, also shown in FIG. 9, are combined with the washer 131 to permit the washer 131 to be brought into engagement with the cable 124 as the nut 130 is advanced. Unwanted abrading is thereby reduced in the manner of FIG. 9 above.

CABLE GRIP ADJUSTING ASSEMBLY OF FIG 11

Figure 11:
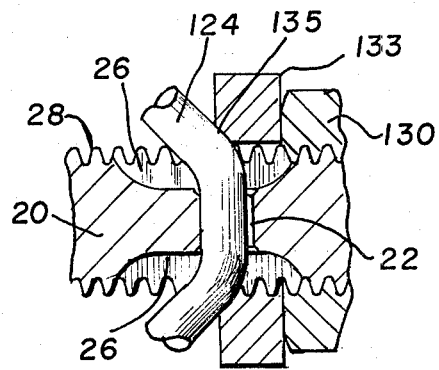
FIG. 11 represents a sectional side view of the construction of the cable grip of FIG. 10 but utilizing a thick washer instead of the thin washer of FIG. 10 and with this particular thick washer having a large inside chamfer around its aperture or hole so as to provide a more gradual engagement with a cable or wire mounted in the transaxial hole.

Referring next to FIG. 11, it is to be noted that the shank portion 20 and the grooves 26 of FIG. 1 are hereby shown. Mounted on the threaded outer portion of threads 28 of the shank portion is a nut 130 which in combination with a much wider washer 133 is used to tighten the cable 124 in the transaxial hole 22. This washer 133 is made with a large chamfer 135 which chamfer engages the cable 124 to urge the cable into a tight, gripping action with the left edge of the transaxial hole 22 and the tapered grooves to cause the cable to be bent to and into the screw to the maximum extent necessary. The advancement of the nut enables the advanced washer to lock the cable in the transaxial hole without abrasion.

ASSEMBLY OF FIG. 12

Figure 12:
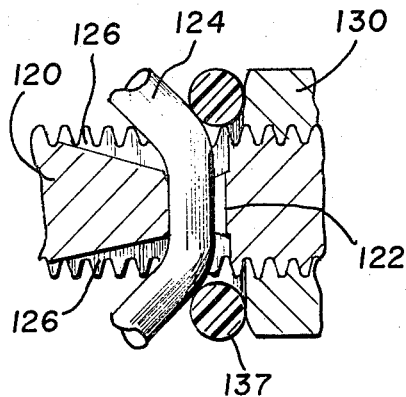
FIG. 12 shows a sectional view similar to the construction of FIG. 8 but, instead of the flat washer of FIGS. 9 and 10, a rounded metal or semirigid plastic ring is used in combination with the nut to provide means for engaging the transversely mounted cable or wire without abrasion thereof as the nut is advanced in the clamping condition.

Referring finally to FIG. 12, there is depicted the shank 120 of FIG. 8 and the nut 130 of FIG. 9 which with the cable 124 of FIG. 9 is retained in the transaxial hole 122. Instead of a slot-faced and chamfered washer there is depicted in this embodiment a holding-type washer 137 which may be of metal or may be of plastic. This washer as it is advanced leftwardly engages the cable 124 on its one rounded face and on the other rightward face engages the left face of the nut 130 as the nut is advanced. As the nut is rotated on the threaded portion and moved leftwardly the cable 124 is tightened in the transaxial hole and groove in the manner above-described.

Although the several embodiments above depicted show the essential feature of this invention it has been consistently shown that the essential portion includes a threaded shank in which two tapered grooves are formed. These grooves are disposed on diametrically opposite sides and have one portion or end of the grooves passing through or into the transaxial hole. The transaxial hole is of a selected size commensurate with the use for which the grip member is to be used.

In association with the threaded shank is a rotating nut or some other type of threaded member which is rotated toward and past the edges of transaxial hole to engage the cable, wire or rope mounted in this transaxial hole.

The cable grip as above described whether the shank portion is associated with portions forming a screw eye, a turnbuckle or a connecting member it is only essential and desirable that the threaded nut member does not cut the mounted cable, wire or rope. This may be accomplished with or without the use of a washer and in combination with the forming of tapered grooves on each side of the transaxial holes. The resulting deflection of the cable, wire or rope is guided to and lays in the grooves in the manner in which the cable, wire or rope is pinched rather than is cut with shearing action.

It is, of course, realized that if only a transaxial hole is formed in the threaded shank and the nut is advanced against this cable, wire or rope, a shear or scissors action is caused to be achieved and this is not the intent of the invention. It is certainly an unwanted result. One of the essential features of this invention is that the cable grip will permit repeated securing of the rope, wire or cable without this shearing action and permit repeated adjustment.

The configuration of the tapered groove is merely a matter of selection and it is, of course, contemplated that in the forming of a groove as by means of cold or hot forging that appropriate knurled surfaces may be provided in the tapered groove and other types of groove forming configurations may also be provided.

In the above description and in the claims the use of the word transaxial in regard to the hole to which the cable, wire or rope is to be fed is not intended to mean that the hole must be exactly through the axis of threaded shank but may be displaced slightly from the axis due to manufacturing tolerances or production-type equipment. It is also to be noted that as above depicted only one transaxial hole is provided with a tapered longitudinal groove at each end of the hole. However, this is not to preclude other transaxial holes either at the same location or at other locations in the threaded shank from being provided also with tapered longitudinal grooves in association with the ends thereof.

Terms such as "left", "right", "up", "down", "bottom", "top", "in", "out", "clockwise", "counterclockwise" and the like are applicable to the embodiments shown and described in conjunction with the drawings. These terms are merely for the purposes of description and do not necessarily apply to the position in which the cable grip may be constructed or used.

While particular embodiments have been shown and described it is to be understood that the invention is not limited thereto and protection by Letters Patent is sought to the broadest extent the prior art allows.

What is claimed is:

1. A cable grip for retaining selectively at least one length of an at least partially flexible member such as a cable, wire, rope and the like, said grip comprising (1) a longitudinally extensive, externally threaded shank member including a threaded midlength portion, said midlength portion being characterized by (i) a transaxial hole and (ii) a pair of substantially diametrically oppositely disposed longitudinal grooves, each groove longitudinally tapering from the outer diameter of the threads to at least the root of the threads and intersecting the transaxial hole at a depth at least equal to the root depth of the threads, and (2) deflecting means mounted on and movable along said threaded shank member, said means including a nut-like member in threaded engagement with and rotatable on said shank member so that said deflecting means may be moved toward and away from said transaxial hole and at least partially along said longitudinal grooves, whereby a cable or the like may be passed through the transaxial hole so that at least some length thereof extends beyond either end of that hole and be secured to said shank member by rotating said nut-like member to advance said deflecting means toward and to said transaxial hole sufficiently for a surface of said means to bear upon said cable and grip it in said hole by deflecting it at either end of that hole at least partially into said longitudinal grooves.

2. A cable grip according to claim 1 in which said threaded midlength portion of said shank member and said nut-like member associated therewith are each of metal and said shank member at one end is configured as an eye-hook.

3. A cable grip according to claim 1 in which said threaded midlength portion of said shank member and said nut-like member associated therewith are each of metal and said shank member at one end is formed with a screwdriver slot and at its other end is configured as an auger-type screw.

4. A cable grip according to claim 1 in which there are two separate shank members each having a threaded midlength portion, one with right-hand threads and the other with left-hand threads and each midlength portion being characterized by a transaxial hole and a pair of hole-intersecting, substantially oppositely disposed longitudinal grooves and each having deflecting means associated therewith, said shank members being retained at their midlength portions in the internally threaded ends of a turnbuckle member whereby two cables may be gripped in said midlength portions and after gripping the turnbuckle may be adjusted to tighten or loosen the gripped cables.

5. A cable grip according to claim 1 in which there is a single shank member with at least two threaded midlength portions in spaced relation thereon, each of said midlength portions being characterized by a transaxial hole and a pair of hole-intersecting, substantially oppositely disposed longitudinal grooves and each having deflecting means associated therewith, whereby a connector for two separate cables is provided or a means for gripping separate portions of a single cable for maintenance of a loop of desired size therein.

6. A cable grip according to claim 1 in which the threads formed both on said midlength portion and in said nut-like member are rounded to provide smooth surfaces with no cutting edges and in which said transaxial hole and said longitudinal grooves intersecting therewith are chamfered at their intersections to reduce shearing or cutting action on a cable passed through said transaxial hole upon the advance of said nut-like member theretoward.

7. A cable grip according to claim 1 in which each of said longitudinal grooves terminates at one end at said transaxial hole.

8. A cable grip according to claim 1 in which chamfers are provided at the intersections of said longitudinal grooves and said transaxial hole.

9. A cable grip according to claim 1 in which said longitudinal grooves extend at least a short distance past said transaxial hole 10. A cable grip according to claim 1 in which said deflecting means further includes a relatively thin washer having a chamfered aperture, said washer being disposed between said nut-like member and said transaxial hole whereby abrasion of a cable passed through that hole upon rotation of said nut-like member and its advance toward said transaxial hole is reduced.

11. A cable grip according to claim 1 in which said deflecting means further includes a relatively thick washer having a large chamfer at its aperture, said washer being disposed between said nut-like member and said transaxial hole with said large chamfer facing that hole whereby abrasion of a cable passed through said transaxial hole upon rotation of said nut-like member and its advance toward said transaxial hole is reduced.

12. A cable grip according to claim 1 in which said deflecting means further includes a washer having a substantially circular cross-section, said washer being disposed between said nut-like member and said transaxial hole whereby abrasion of a cable passed through that hole upon rotation of said nut-like member and its advance toward said transaxial hole is reduced.

* * * * *